Patented July 7, 1953

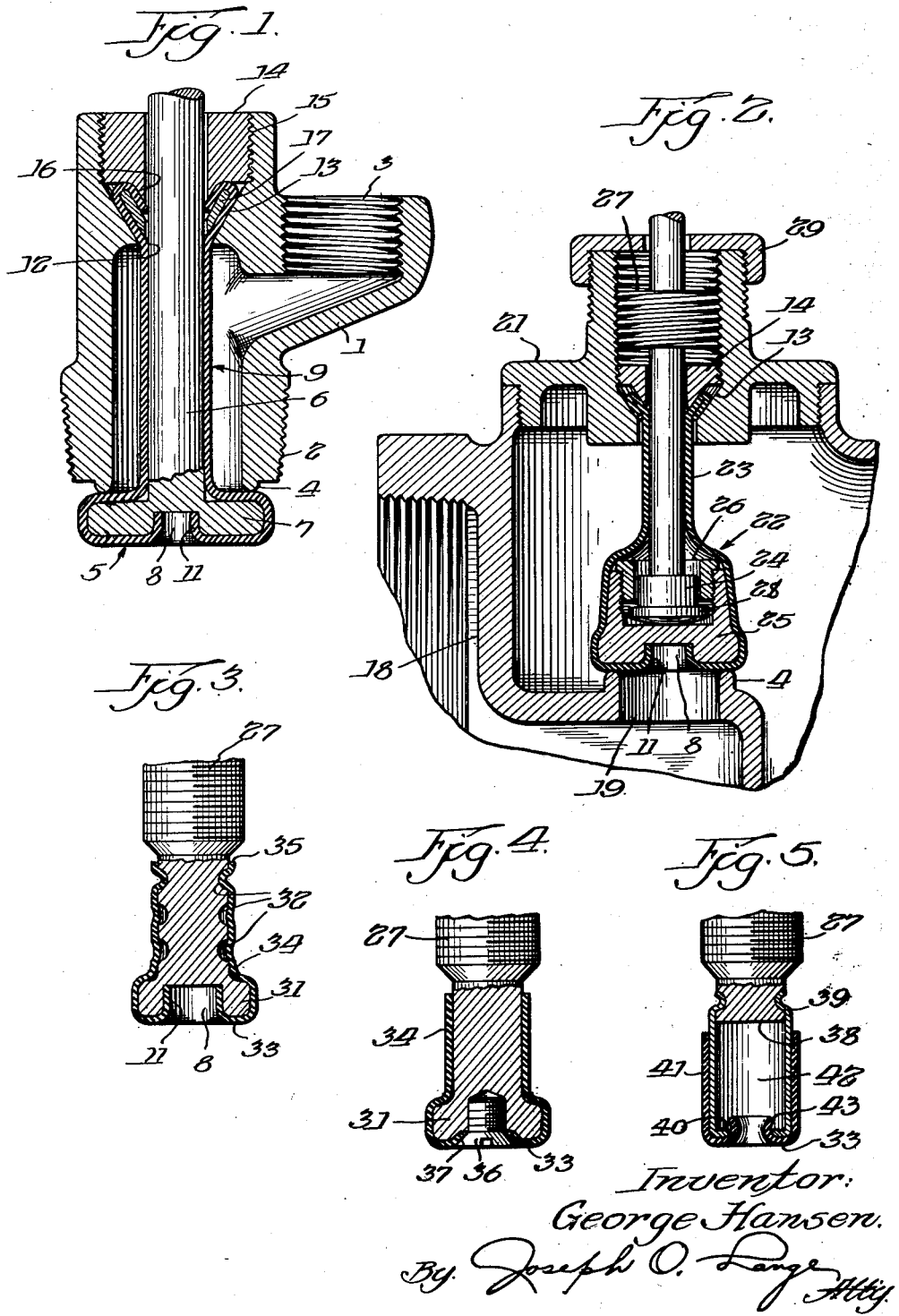

2,644,664

UNITED STATES PATENT OFFICE 2,644,664

VALVE

George Hansen, Chicago, Ill., assignor to Crane Co., Chicago, Ill., a corporation of Illinois Application December 22, 1947, Serial No. 793,139

5 Claims. (Cl. 251—159)

This invention relates to valves and more particularly to a valve using a novel form of seating means between the disc or closure member and the valve seat.

Heretofore it has been difficult to obtain a valve in which the valve closure member would remain tight under conditions of varied services. By the present invention different types of easily renewable valve seating materials may be conveniently and cheaply applied. I am aware that packless or diaphragm types of valves have heretofore been employed, but to my knowledge none has possessed the advantages of this invention.

It is one of the more important objects of this invention to provide for a valve construction in which easy seat face renewability may be effected and also one in which the valve may be readily sealed at its upper end portion between the stem bearing and the valve body or bonnet connection without employing a stuffing box.

Another important object is to provide for a construction in which the use of composition or renewable discs may be eliminated and the more expensive and relatively complicated connections between the disc and the disc holder may also be avoided.

Another object is to provide for a valve construction in which resistance to corrosion is easily handled by virtue of the fact that the disc itself and a substantial portion of the actuating stem construction may be effectively covered by an elongated extension of the renewable seat facing of the closure member thereby to provide for a continuous connection between the protected portion of the stem bearing and the disc, enabling both members to resist corrosion against the line fluids being conveyed.

Another benefit arising from the use of this invention is that the construction is applicable to any valve employing conventional closure members without requiring the use of independent locking means. It will be apparent also in the latter connection that faucets and similar water valves can be repaired with this construction more easily than heretofore, and if a new disc is required the resilient or flexible material as hereinafter described can be axially moved, stretched and brought down so that the described cycle may be repeated as many times as a new closure seat is required.

Other objects and advantages will become more readily apparent upon proceeding with the following specification in light of the accompanying drawings in which:

Fig. 1 is a fragmentary sectional assembly view of a preferred embodiment of my invention.

Fig. 2 is a modified view of the form shown in Fig. 1, in a fragmentary sectional assembly view.

Figs. 3, 4 and 5 are further modified forms.

Similar reference characters refer to similar parts throughout the several views.

Referring now to Fig. 1, the fragmentary body or casing 1 is shown having the usual inlet 2 and the outlet 3. Adjacent to the inlet 2 a seat is provided consisting of the annular projection 4 against which the usual closure member generally referred to as 5 abuts in seating relation. The closure member 5 consists substantially of a stem portion 6 having a lower head 7 preferably recessed as at 8 for reasons hereinafter described. The stem may be reciprocally moved either by means of the usual threads (not shown) or else by suitable lever means (also not shown) in order to effectually move the closure member to open and closed positions. As indicated, the stem 6 is enclosed in a tightly fitted sleeve preferably of rubber or the like, generally referred to as 9 and having an inwardly extending lower portion around the head 7 of the stem so as to allow for entry of the extension 11 within the recess 8. It will be apparent that because of being relatively tightly stretched over the stem, the lowermost end of the sleeve 9 when contained within the recess 8 is snugly fitting, as indicated. At the upper end portion of the stem where the sleeve bears against the body surface bearing at 12, a frusto-conical space 13 is formed within which the upper end limits of the sleeve 9 are contained as shown, the bushing 14, threaded as at 15, being used to hold the preferably folded-over sleeve as at 16 in compressed position as indicated. It may be desirable, although not necessary, that a frusto-conical spacer member 17 be used. Thus it will be apparent that the stuffing box normally employed around the upper stem portion is eliminated and is conveniently replaced by the form of connection described.

It will be apparent in the construction described and in Fig. 2 that when the valve disc is moved from its seat as at 4, the sleeve 9 being preferably of a rubber-like material, will stretch suitably to permit the described closure movement, thus protecting the stem 6 against the detrimental action of corrosive fluids. Further it will be apparent that as wear occurs at the turned-in or flanged portion of the sleeve where it contacts the seat 4 axial movement of the sleeve along the stem 6 either upwardly or downwardly will provide for a new seating surface by merely loosening the bushing 14 and permitting the rubber sleeve to be withdrawn to the extent necessary for providing a new contact surface at the seat 4.

It will be equally clear that because of employing a new or unused portion of the folded-over end 16, increased tightness may be effected at this portion of the sleeve if wear has previously occurred. Thus in both ends where contact is made with the body, it will be materially improved by simple movement of the sleeve longitudinally along the stem first at the seat 4 and second at the stuffing box portions 13 respectively. Thus it will be apparent that a simple substantially tubular form of resilient material has been provided which when stretched over the core in the form of a disc holder or stem serves a dual purpose, the resilient member 9 serving as the disc contact surface when closing the valve and allowing the resilient material to be drawn over the stem head 7 with ends folded back into the recess 8 as indicated. Thus the construction does not necessarily require a screw member as shown and hereinafter described in connection with Fig. 4 to hold the rubber in place. The outer periphery of the recess wall acts as a shoulder when fluid line pressure is applied to the contact surface at 4 of the valve. Since the tubular member 9 is axially movable upon the stem when temporarily loosened at 14, it can be changed so that as the material wears, the old seating surface can be easily drawn down (or up) and a new fresh seating contact can be supplied easily and continuously many times. Since the tubular resilient material is stretched over the metal more initially a tight fluid seal is effected which line pressure will help to keep tight. No one apparently previously has appreciated the fact that by having a tubular resilient member predeterminedly movable axially, new seat contacts can easily be made and fluidtightness also effected at the upper end portion normally sealed by a stuffing box and packings.

Referring now to Fig. 2, a modified construction is shown in which a swivel type of stem is employed with the closure member. A fragmentary body 18 is shown having the seat opening 19, the usual valve seat 4, and a bonnet supporting portion 21 for the stem and closure member threaded in position at the upper end of the body as shown. The latter connection, while shown as threaded, may of course be bolted, welded, or otherwise suitably connected to the body 18. Directing attention to the arrangement for supporting the flexible tubular member or sleeve generally referred to at 22, the latter encloses a substantial portion of the length of the stem 23 and also its head portion 24 which latter portion is swiveably connected to the disc holder 25 by means of the threaded bushing 26. Thus relative rotational movement is provided between the stem and the disc holder 25 in order to permit the stem having the integral threads 27 to be rotatably movable and thereby effect reciprocal movement of the disc and sleeve during the course of opening and closing the valve, that is moving to and from the valve seat 4 without necessarily rotating the member 25. Preferably in order to guide the stem relatively closely in relation to the head 25, the stem is made with the shouldered portions 24 and 28.

Similar to the manner described in connection with Fig. 1, the upper annular folded-over portion of the sleeve 22 is retained on the frusto-conical surface 13 as indicated by means of the bushing 14. A conventional cover 29 is threadedly mounted as shown. At the upper end of the stem, a hand-wheel (not shown) is usually provided in order to effect the desired rotational movement of the stem. In the instant construction it will be apparent that the rotatably mounted stem by reason of its rotation upon threads 27 will lift the disc 25 or lower the same (depending upon the direction of rotation) and allow for the sleeve as described in connection with Fig. 1 to be stretched, as shown, when in the closed position, the sleeve member at its lowermost end portion 11 being received within the recess 8. As in Fig. 1, the sleeve is easily moved upwardly or downwardly axially relative to the stem and the disc holder, in order to make the change in the contact surface at 4 when undue wear occurs. By the same token the contact of the folded upper end portion of the sleeve is easily made or broken with the frusto-conical surface 13 when the sleeve is moved axially to its previous position relative to the stem and holder. It should, of course, be clear that the detailed manner in which the connection is made at the upper end portion of the sleeve 22 and also the manner in which it is stretched over the disc holder 25, may vary substantially from the details shown. For example the shape of the closure member may be changed in order to suit the particular installation or the type of valve employed for such installation. In the latter connection reference is made to the modified forms of Figs. 3, 4 and 5 which show methods in which the flexible tubular or sleeve member may be mounted over certain types of disc holders or end portions of stems as the case may be in order to suit various types of valves employed and in which the sleeve is mounted solely upon such members as the disc holders or stems without attachment to the casing as hereinabove described.

Referring now to Fig. 3 it is deemed desirable under certain conditions to notch the end portion of the stem annularly as at 32 above the head 31 as indicated. As wear occurs on the seat face 33 the sleeve 34 is stretched and moved axially either upwardly or downwardly over the head 31. The end portion 35 will then engage one of the notches 32 depending upon the amount of wear which has taken place at the seat contact 33. The lower end portion 11 of the sleeve as described in connection with Figs. 1 and 2 preferably extends within the recess 8. The particular purpose of the annularly extending grooves 32 is to inhibit relative axial movement of the sleeve 34 in connection wtih the stem head 31, but the detailed method of attachment is not specially important and may vary considerably from that illustrated.

Directing attention to Fig. 4 a similar construction is shown which may be made unnotched as illustrated. However at the lower end portion of the head 31 normally providing the recess 8 (see Fig. 3), a more positive means is used to attach and hold the lower end portion of a sleeve 34. Specifically a counter-bore head machine screw 36 is used which clamps the inner end portions of the sleeve 34 against the counter-bored surface 37 as shown. Thus in this construction if line fluid pressure should be on top of the disc 31 rather than on the underside of the seat 4 the screw 36 will tend to prevent any slipping down of the sleeeve 34, i. e., it will inhibit relative axial movement of the sleeve. In most cases the usual stem thread 27 is employed for the purpose of providing the desired reciprocal or axial movement of the closure member or stem relative to the seat 4, the latter not being shown, but being similar to that illustrated in Fig. 2. It has been found that with such method of attachment as hereinabove provided it is not necessary to engage or otherwise restrain the upper end portion of the sleeve against relative axial movement. When the seat portion 33 must be renewed due to wear, it can be done easily by simply unscrewing the counter-bore screw 36 so that the end portion immediately adjacent the screw head may be moved to provide the desired new seating surface 33.

In Fig. 5 a still further modified form is shown in which the end portion of the stem is provided with an enlargement or head 38 over which is spun or otherwise attached the tubular extension 39. Obviously the latter member may be suitably brazed, threaded or otherwise attached to the head portion 38. At its opposite end the extension 39 is folded inwardly to provide the inner annular flange 40 over which is suitably stretched the flexible sleeve 41. It will be apparent that by this arrangement a large chamber 42 is provided, whereby as wear occurs at the seat portion 33 the sleeve 41 is moved downwardly or upwardly (as the case may require) relative to the extention 39. It will be clear that a considerable amount of axial movement downwardly relative to the head extention 39 may take place by simply folding the flexible sleeeve as at 43 within the chamber 42, the seat contact surface 33 changing as wear occurs in the same manner as described in connection with the previous fingers. Obviously this construction enables changes to be made relatively easy without the necessity of doing any trimming of the end of the sleeve as seat wear occurs. In certain small sizes and types of valves the latter feature may be desirable as for example in the relatively cheaper types of valves such as radiator valves, water valves, hose valves and the like.

While this invention has been shown in several forms it should be obvious to those skilled in the art that it is not so limited but is susceptible of various changes and modifications without departing from the spirit thereof or the scope of the appended claims.

I claim:

1. A progressively renewable seating face of flexible material snugly enclosing a valve closure member with a transverse end surface and a hollow central portion, the flexible material being in substantially tubular form, said seating face extending in a flat radial plane relative to the control axis of the said closure member and being formed as an annular deflection of an end portion of the flexible material, the latter material being predeterminately movable axially while maintaining substantial surface contact with the said closure member to selectively provide a new seating face over the transverse end surface of said closure member upon occurrence of such axial movement of the flexible material relative to the said closure member, and means engaging the hollow central portion of the valve closure member and gripping the annular deflection of said flexible tube to predeterminately retain the latter member in fixed axial position.

2. A progressively renewable seating face for a portion of a valve closure member or the like having a hollow lower end portion, the combination including the mounting on said closure member of a tubular member of flexible material axially movable predeterminately relative to the closure member and having on its pernphery adjacent the said end portion of the closure member a plurality of progressively usable transverse annular seating faces, an end rim portion of said tubular member beyond the lowermost of said seating faces being inwardly turned annularly within the hollow lower portion of the closure member to form the extension of a tubular angular deflection of the said flexible material inwardly.

3. A tubular axial member of distortable material serving as the seating face of a valve closure, the combination including a valve casing, said seating face being progressively renewable upon the occurrence of predetermined steps effecting axial movement of said flexible material relative to the closure member, one end of said flexible material being enlarged and being retained in fluidtight relation to the valve casing to restrain said flexible material against axial movement, the said closure member including a head portion with an end transverse surface portion to support an end rim of the said distortable tubular member, said closure member having central reduced annular means in a plurality of planes to facilitate holding said distortable member at successive end axial positions.

4. A tubular angularly deflectable member of flexible material serving as the seating face for a valve closure member, said seating face being progressively renewable upon predetermined axial movement of said flexible material relative to the closure member, annular recess means provided by an annular transverse surface of the closure member for engagement by an annular end portion of the said flexible material whereby an inner annular portion of said flexible material axially parallel to the tubular portion of said flexible material may be retained to hold said flexible material against combined axial and transverse displacement in a plurality of planes relative to said closure member.

5. The combination of a tubular member for providing contact faces in fluidtight joints and a core with a depressed end portion within the tubular member, said tubular member being of flexible material predeterminately movable relative to said core, at least a lower head end portion of said core being substantially enclosed by said flexible material except for a central inturned annular end portion of the tubular member received within the core depressed end portion, said tubular member upon successive steps of axial movement relative to the said core thereby providing a new contact face for a fluidtight face in substantially a plane transverse to the direction of axial movement upon the occurrence of such movement of said tubular member upon the said core, said tubular member being movable in opposite axial directions relative to the core to effect the said renewal of the contact face.

GEORGE HANSEN.

References Cited in the file of this patent

UNITED STATES PATENTS

| Number | Name | Date |
|---|---|---|
| 21,858 | Swan | Oct. 19, 1858 |
| 48,721 | Regester | July 11, 1865 |
| 347,156 | Bowen | Aug. 10, 1886 |
| 1,602,047 | Shultheis | Oct. 5, 1926 |
| 1,971,186 | Kernas | Aug. 21, 1934 |
| 2,226,972 | Greve | Dec. 31, 1940 |
| 2,444,471 | Samiran | July 6, 1948 |

FOREIGN PATENTS

| Number | Country | Date |
|---|---|---|
| 14,245 | Great Britain | of 1852 |
| 40,079 | Germany | of 1887 |
| 603,632 | France | of 1926 |